United States Patent

Uchiyama et al.

[11] 3,983,978
[45] Oct. 5, 1976

[54] CURRENT COLLECTING SYSTEM FOR SELF-PROPELLED AERIAL TRAMWAY CARRIAGE USING TWO SUPPORTING CABLES

[75] Inventors: Hiromichi Uchiyama; Yukiyoshi Hatori, both of Tokyo, Japan

[73] Assignee: Nissan Motor Company, Limited, Japan

[22] Filed: Sept. 26, 1974

[21] Appl. No.: 509,419

[30] Foreign Application Priority Data

Oct. 8, 1973  Japan.................. 48-117178[U]

[52] U.S. Cl................. 191/45 R; 191/40; 191/50; 104/112; 191/57
[51] Int. Cl.².......................................... B60L 5/00
[58] Field of Search.............. 191/22 R, 33 R, 45 R, 191/40, 49, 50, 57; 104/112

[56] References Cited
UNITED STATES PATENTS

| 1,509,522 | 9/1924 | Matthes................................ 191/57 |
| 2,523,662 | 9/1950 | Miller.................................. 191/57 |
| 2,632,153 | 3/1953 | Swanger............................... 191/57 |

FOREIGN PATENTS OR APPLICATIONS

| 12,211 | 1897 | United Kingdom................... 191/57 |

Primary Examiner—Stanley H. Tollberg
Assistant Examiner—D. W. Keen
Attorney, Agent, or Firm—Robert E. Burns; Emmanuel J. Lobato; Bruce L. Adams

[57] ABSTRACT

Electric power is provided to the motor of a self-propelled carriage of an aerial ropeway through two cables by which the carriage is supported.

7 Claims, 3 Drawing Figures

CURRENT COLLECTING SYSTEM FOR SELF-PROPELLED AERIAL TRAMWAY CARRIAGE USING TWO SUPPORTING CABLES

This invention relates to a current collecting system for the motor of a self-propelled carriage of an aerial ropeway with two supporting cables.

It is well known that aerial ropeway are used to cross canyons or rivers. It is also well known for an aerial ropeway to have a carriage supported by a pair of cables suspended between two or more towers. The carriage is suspended by two cables and fitted with a plurality of grooved drive wheels that ride on the supporting cables. Electric power is provided to a motor in the carriage from two power transmitting lines which are supported by the two cables through suitable supporting means.

However, steady provision of electric power for this aerial ropeway is impossible because the suspended carriage and/or the power transmitting lines swing considerably and the contact is thus interrupted between current collecting shoes of the carriage and the transmitting lines.

It is therefore an object of the present invention to provide an improved current collecting system for a self-propelled carriage of an aerial ropeway which will maintain steady supply of electric power from power transmitting lines.

A further object of the present invention is to provide an improved current collecting system of an aerial ropeway in which current collecting shoes of the carriage will have good sliding contacts with power transmitting lines.

Other objects and advantages of the present invention will become clear from the following description when considered in connection with the accompanying drawings in which like reference numerals and characteristics designate corresponding parts and units in some figures and in which.

Figure 1:
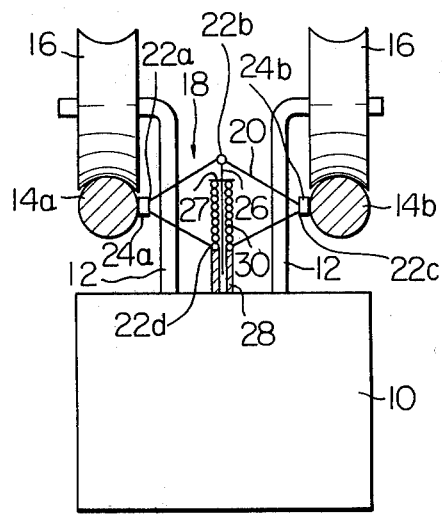
FIG. 1 is a schematic illustration of a preferred embodiment of a current collecting system according to the present invention.

Referring now to FIG. 1, one preferred embodiment of a current collecting system of the present invention is illustrated as used for a self-propelled carriage of a ropeway. A carriage 10 of the aerial ropeway is supported in such a manner that the carriage 10 is suspended through an assembly of a plurality of suspending members 12 by two parallel cables 14a and 14b fitted with a plurality of insulated grooved drive wheels 16 that ride on the cables 14a and 14b. The cables 14a and 14b are generally suspended between two or more towers (not shown). The drive wheel 16 are driven by a motor (not shown) of the carriage 10 through any suitable driving means. It should be noted that the two cables 14a and 14b are electrically conductive to transmit electric current therethrough. Locked coil wire ropes are preferably used as the cables 14a and 14b for more effective current collection.

The current collecting system comprises a pantograph trolley or current collector assembly 18 which is interposed between the cables 14a and 14b for collecting current from the cables 14a and 14b and providing the motor in the carriage 10 with electric power. The pantograph trolley 18 includes a four pivot pantograph 20 formed with four dimensionally equal members. The four pivot pantograph 20 has first, second, third and fourth pivots 22a, 22b, 22c and 22d, in which the first and the third pivots 22a and 22b are opposite to each other and the second and the fourth pivots 22b and 22d are opposite to each other. Two current collecting shoes 24a and 24b are attached to the first and third pivots 22a and 22c, respectively. At the second pivot 22b, a guide rod 26 having a seat 27 thereon is attached and slidably inserted into a guide tube 28 which is connected to the fourth pivot 22d of the pantograph 20. The guide tube 28 is also secured onto the carriage 10. A helical spring 30 comprises means for biasing the pantograph and is disposed around the guide rod 26 and fixed at its one end to the seat 27 and at its other end to the fourth pivot 22d of the pantograph 20. The spring 30 urges the second and the fourth pivots 22b and 22d of the pantograph 20 toward each other and therefore forces the pair of current collecting shoes 24a and 24b to springily contact the two cables 14a and 14b respectively.

In this instance, it will be understood that the distance between the two cables 14a and 14b is maintained constant since the two cables 14a and 14b are held by the drive wheels 16 which are mounted at certain fixed positions with respect to the carriage 10. It will be also understood that the two current collecting shoes 24a and 24b are insulated from each other and electrically connected to the not shown motor of the carriage 10.

Figure 2:
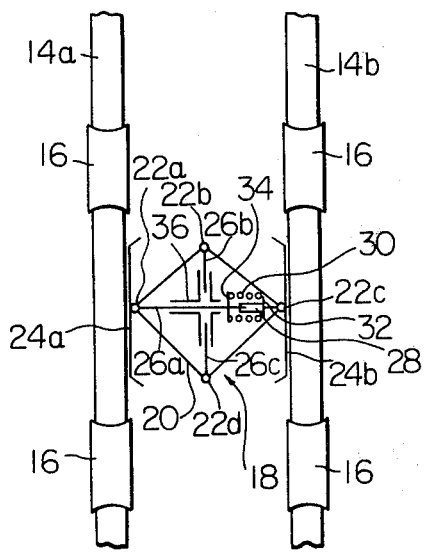
FIG. 2 is a schematic illustration of a modified example of a pantograph collector of the current collecting system of FIG. 1.

FIG. 2 illustrates a modified embodiment of the pantograph trolley 18 in which the four pivots of the pantograph 20 are arranged in the horizontal plane with respect to the carriage (not shown) as contrasted with that shown in FIG. 1 which is arranged in the vertical plane with respect to the carriage 10.

The pantograph 20 with four pivots has the first, second, third and fourth pivots 22a, 22b, 22c and 22d, in which the first and third pivots 22a and 22c are opposite to each other and the second and fourth pivots 22b and 22d are opposite to each other. The two current collecting shoes 24a and 24b are attached to the first and third pivots 22a and 22c and in turn slidably contact the two cables 14a and 24b respectively. A main guide rod 26a is attached to the first pivot 22a and slidably inserted into the guide tube 28 which is fixedly connected to the third pivot 22c of the pantograph 20.

The spring 30 is disposed around the guide tube 28 and seated at its one end on a spring seat 32 which is disposed about the periphery of the guide tube 28 and at its other end on another spring seat 34 which is disposed on the main guide rod 26a. The spring 30 urges the first and the third pivots 22a and 22c to separate from each other and therefore forces the two shoes 24a and 24b to springily contact with the two cables 14a and 14b respectively. The main guide rod 26a slidably passes through one intersecting tube of a four-way guide tube 36 which is disposed at the centre of the pantograph 20. Two secondary or subguide rods 26b and 26c are attached to the second and the fourth pivots 22b and 22d and slidably inserted into another intersecting tube of the four-way guide tube 36. The two subguide rods 26b and 26c are opposite to each other within the other intersecting tube. In this instance, two drive wheels 16 of the carriage (not shown) ride on the cable 14a and the other two drive wheels 16 ride on the other cable 14b.

Figure 3:
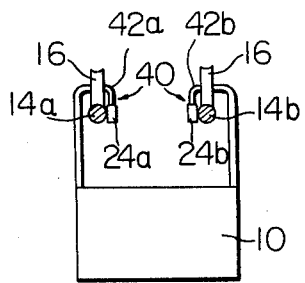
FIG. 3 is a schematic illustration of another preferred embodiment of a current collecting system according to the present invention.

FIG. 3 illustrates another preferred embodiment of a current collecting system of the present invention. The current collecting system comprises current collector assembly 40. The current collector assembly 40 includes the two current collecting shoes 24a and 24b which slidably contact with the pair of cables 14a and 14b respectively. The shoes 24a and 24b connect with the corresponding axles of the drive wheels 16 through two connecting members 42a and 42b. In this instance, the connecting members 42a and 42b have spring-like or resilient characteristics, and the shoes 24a and 24b therefore springily contact the cables 14a and 14b respectively.

It should be noted that since the two current collecting shoes 24a and 24b of the present invention springily contact the two cables 14a and 14b respectively through which electric current flows, steady collection of the current from the cables 14a and 14b is possible even if the carriage 10 swings considerably. In addition, since the cables 14a and 14b also serve as power transmitting lines, independent current transmitting lines are not required in the current collecting system of the present invention.

What is claimed is:

1. In an aerial ropeway system or a like system of the type having a pair of generally parallel power transmission cables; a carriage suspended from said pair of cables for traveling therealong; suspension means for suspending said carriage from said pair of cables to travel therealong; and a current collecting system for making continual electrical contact with said pair of cables to draw current therefrom as said carriage travels along said pair of cables; wherein said suspension means comprises a pair of electrically insulative drive wheels each having a circumferential groove for receiving one of said power transmission cables and each being disposed on a respective one of said power transmission cables and riding thereon as said carriage travels along said pair of cables, and a pair of suspending members fixed to said carriage and each connected to a respective one of said drive wheels to allow rotation thereof in order to maintain said carriage a fixed distance from said pair of cables as said carriage travels therealong; and wherein said current collecting system comprises a pantograph and a pair of current collecting shoes disposed on opposite corners thereof for contacting each current collecting shoe to a respective one of said power transmission cables to effect electrical contact between said current collecting shoes and said power transmission cables as said carriage travels along said power transmission cables, means for attaching said pantograph to said carriage to maintain said current collecting shoes positioned opposite the respective ones of said power transmission cables, and means for biasing said pantograph to maintain said current collecting shoes in electrical contact with said power transmission cables, whereby irregularities in the spacing between said power transmission cables do not interrupt the electrical contact between said current collecting shoes and said power transmission cables as said carriage travels therealong.

2. An aerial ropeway system according to claim 1, wherein said means for biasing the pantograph comprises a helical spring.

3. An aerial ropeway system according to claim 1, wherein said pantograph comprises four elongated members of equal length, and means pivotally connecting said elongated members at the ends thereof to form said pantograph having four pivots defining four corners of said pantograph; and wherein said current collecting shoes are mounted on said pantograph at an opposed pair of said four corners.

4. An aerial ropeway system according to claim 3, wherein said means for biasing comprises a helical spring mounted to bias the opposite corners of said pantograph at which said current collecting shoes are mounted in opposite outward directions thereby to maintain said shoes in electrical contact with the power transmission lines.

5. An aerial ropeway system according to claim 3, wherein said means for biasing comprises a helical spring mounted to bias the opposite corners of said pantograph free of said current collecting shoes in opposite inward directions thereby to maintain said shoes in electrical contact with the power transmission lines.

6. An aerial ropeway system according to claim 3, further comprising: a guide tube connected to the pivot of said pantograph at a corner free of said current collecting shoes; a guide rod connected to the pivot of said pantograph at the corner opposite the corner at which said guide tube is connected, said guide rod extending into said guide tube and having a spring seat; and wherein said means for biasing comprises a helical spring disposed with said guide rod extending therethrough and attached to said spring seat and said pivot at the corner of said pantograph adjacent said guide tube.

7. An aerial ropeway system according to claim 3, further comprising: a guide tube connected to one of the pivots of said pantograph at which one of said current collecting shoes is mounted, said guide tube having a first spring stop adjacent the pivot of said pentograph to which said guide tube is connected; a main guide rod connected to the other pivot of said pentograph at which one of said current collecting shoes is mounted and extending into said guide tube, said main guide rod having a second spring stop; a four-way guide tube comprised of two perpendicularly intersecting tubes disposed at the center of said pentograph with said main guide rod extending through one of said two perpendicularly intersecting tubes; two secondary guide rods each connected to a respective one of the pivots of said pentograph free of said current collecting shoes and extending into opposite ends of the other of said two perpendicularly intersecting tubes; and wherein said means for biasing comprises a helical spring disposed between said first and said second spring stops with said main guide rod extending therethrough.

* * * * *